US012129565B2

(12) United States Patent
Kuo et al.

(10) Patent No.: US 12,129,565 B2
(45) Date of Patent: Oct. 29, 2024

(54) ELECTRODE FOR ELECTROLYSIS AND ELECTROLYSIS DEVICE AND PUMPING DEVICE USING THE SAME

(71) Applicant: National Yunlin University of Science and Technology, Yunlin (TW)

(72) Inventors: Chia-Lung Kuo, Yunlin (TW); Chin-Ta Chen, Yunlin (TW)

(73) Assignee: National Yunlin University of Science and Technology, Yunlin (TW)

( * ) Notice: Subject to any disclaimer, the term of this patent is extended or adjusted under 35 U.S.C. 154(b) by 531 days.

(21) Appl. No.: 17/505,524

(22) Filed: Oct. 19, 2021

(65) Prior Publication Data

US 2022/0119974 A1    Apr. 21, 2022

(30) Foreign Application Priority Data

Oct. 20, 2020   (TW) .................................. 109136350

(51) Int. Cl.
*C25B 9/13*      (2021.01)
*C25B 1/02*      (2006.01)
*C25B 9/30*      (2021.01)

(52) U.S. Cl.
CPC .................. *C25B 9/13* (2021.01); *C25B 1/02* (2013.01); *C25B 9/30* (2021.01)

(58) Field of Classification Search
None
See application file for complete search history.

(56) References Cited

U.S. PATENT DOCUMENTS 5,676,805 A * 10/1997 Silveri .................. C02F 1/4602
                                                          204/216
2019/0376201 A1   12/2019 Chiang et al.

FOREIGN PATENT DOCUMENTS

JP        2012-40489 A    3/2012
TW           1669419 B    8/2019

* cited by examiner

*Primary Examiner* — Louis J Rufo
(74) *Attorney, Agent, or Firm* — Chun-Ming Shih; LANWAY IPR SERVICES

(57) ABSTRACT

The present invention provides a pump device comprising a housing and a electrode device. The housing has an inlet and an outlet arranged at a side of the housing for allowing a first flow flowing into the housing. The electrode device is arranged in the housing, and comprises a rotating body having a fluid inlet, a plurality of first flow channels, at least one first electrode and at least one second electrode. The rotating body is driven to rotate thereby generating a negative pressure for drawing the first fluid into the plurality of first flow channels through the fluid inlet such that the first fluid is reacted with the first and second electrodes thereby generating micro bubbles and is exhausted from the plurality of first flow channels. The first flow having micro bubbles are exhausted from the housing through the outlet.

12 Claims, 15 Drawing Sheets

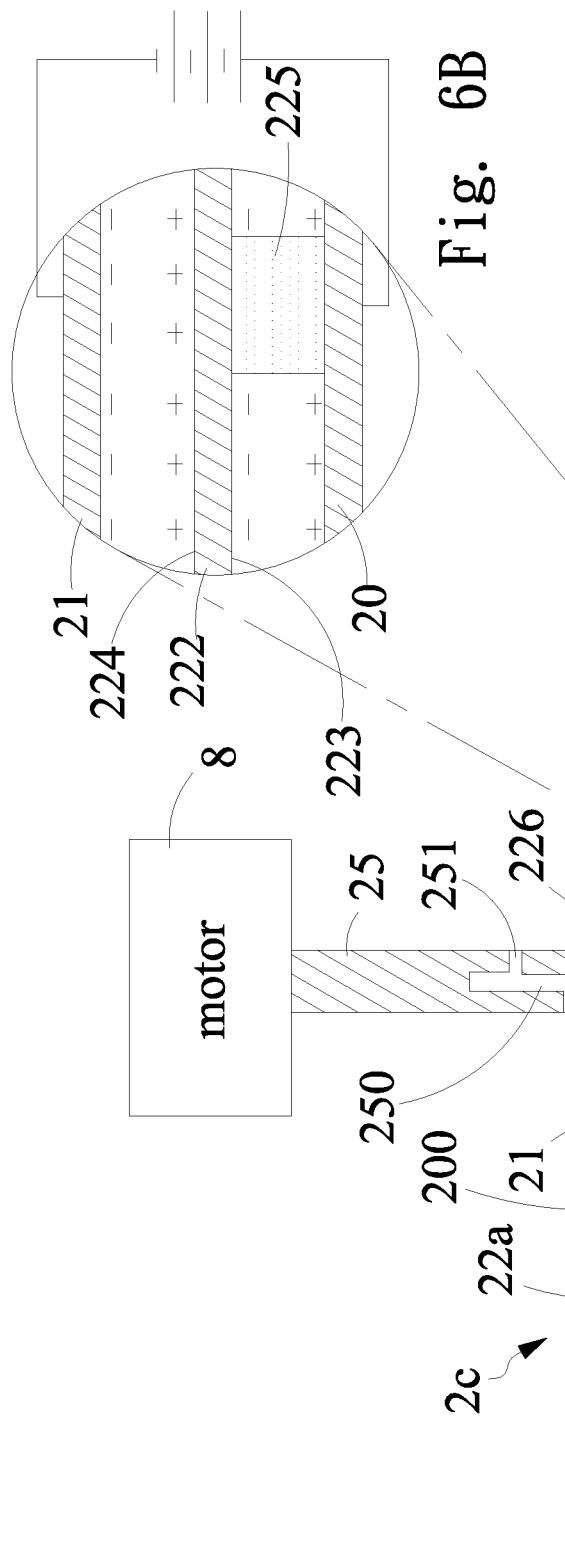
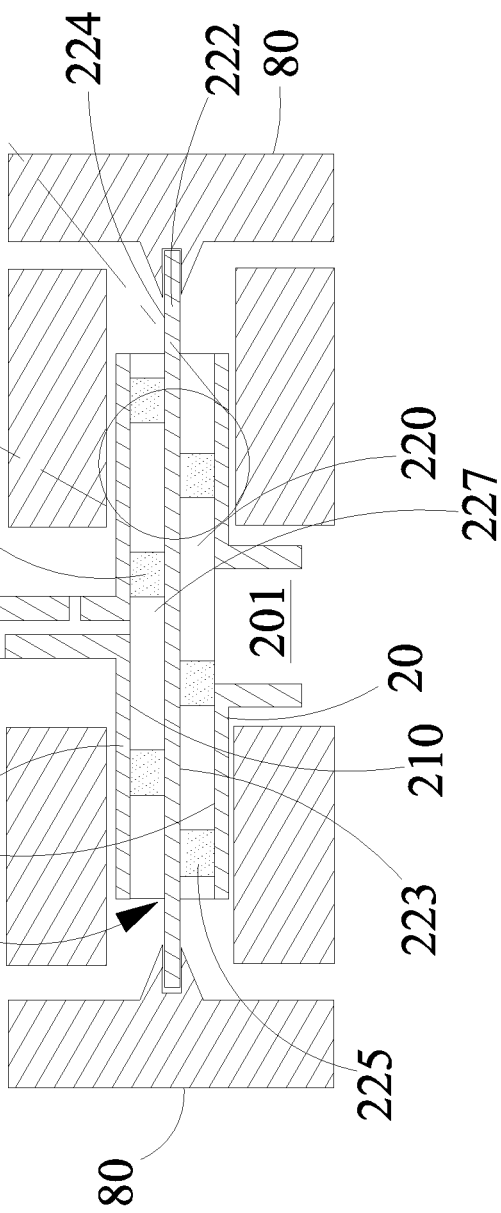
Fig. 6B
Fig. 6A

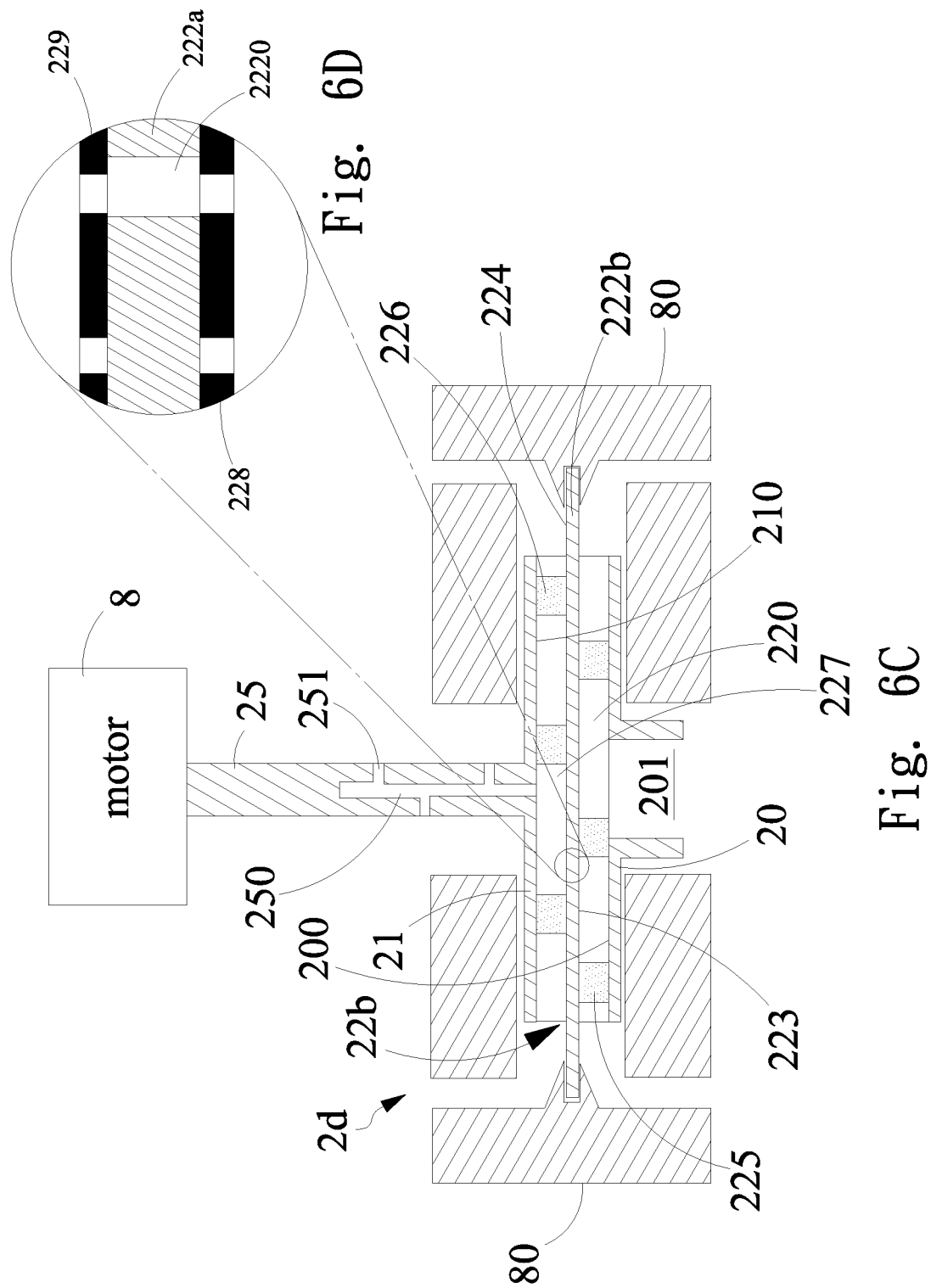

ELECTRODE FOR ELECTROLYSIS AND ELECTROLYSIS DEVICE AND PUMPING DEVICE USING THE SAME

This application claims the benefit of Taiwan Patent Application Serial No. 109136350, filed on Oct. 20, 2020, the subject matter of which is incorporated herein by reference.

BACKGROUND OF INVENTION

1. Field of the Invention

The present invention is related to an electrolysis technology, and more particularly, to an electrode device having rotating electrodes for improving efficiency of electrolytic reaction and electrolytic device for generating pumping effect through a rotating structure.

2. Description of the Prior Art

Although the highly developed industries can improve the life progress of human being, the environmental problem accompanied therewith and influence on the ecology of the Earth are becoming concerns of human being. In the recent years, especially to nowadays that the environmental awareness is increased, the development of green technology associated with the environment is promoted by the government of each country around the world. The fossil fuels such as gasoline or gas, for example, will generate carbon dioxide after burning and the gradually increased carbon dioxides causes the green house effect so as to gradually increase the surface temperature of Earth thereby seriously impacting the biophysical environment of our planet. Therefore, the global warming effect becomes the major issue around the world and how to reduce the utilization of fossil fuel becomes the vital subject of human being.

From the view point of carbon dioxide reduction, the technology for generating hydrogen by using the water as a source for electrolytic reaction is an effective measure for reducing the exhausting carbon dioxide. The hydrogen is a clean fuel for generating electricity, which is a choice of green energy.

Conventional art such as TW patent No. 1669419, disclosed an electrolytic device including a housing, an electrolytic plate, and a rotating member. The housing has a first surface and a second surface opposite to each other. The electrolytic plate is disposed in the housing, and the electrolytic plate includes a rotating plate, a working electrode, and a counter electrode. The working electrode and the counter electrode are respectively disposed on the rotating disk, and the working electrode and the counter electrode are separated from each other. The rotating member is pivoted on the rotating disk, so that the electrolytic disk can rotate in the housing. In this prior art, since the electrolytic plate is rotatably connected to the rotating member, the working electrode and the counter electrode can be driven to rotate in the housing, whereby the bubbles formed on the surface of the electrodes can be eliminated through rotating the electrolytic disk such that the energy consumption due to the resistance of rotation can be improved thereby increasing the efficiency of electrolysis.

Alternatively, another prior art such as Japanese published No. 2012-040489, disclosed an electrolytic ion water generating method and device for effectively producing low-cost electrolyzed alkaline water. The device comprises a generation tank capable of storing a raw water, an electrolyte tank provided with an electrolyte-storing chamber capable of storing an aqueous electrolyte solution, an ion-exchange membrane, and the anode and cathode plates sandwiching the ion exchange membrane. The electrolyte tank can be immersed into the raw water in the generation tank, and the ion exchange membrane partitions the raw water in the generation tank and the electrolyte solution in the electrolyte storing chamber of the electrolyte tank. The anode plate is arranged at the side of the electrolyte storing chamber for being capable of contacting with the electrolyte solution in the electrolyte storing chamber, and the cathode plate is arranged at a raw water side for being capable of contacting with the raw water in the generation tank thereby isolating the generation tank from the electrolyte tank immersed in the raw water.

SUMMARY OF THE INVENTION

The present invention provides an electrolytic device. According to the research result, the electrical resistance will affect the efficiency of reaction during the electrolysis process. The primary electrical resistance and energy consumption during the electrolysis process are caused due to the bubble effect and transmission resistance of the material/ions within the electrolytic liquid. In the present invention, the centrifugal force generated by rotating anode and cathode plates having blade structures formed thereon are utilized to throw the oxygen bubbles formed on the surface of the anode and hydrogen bubbles formed on the surface of the cathode out of the electrolytic device thereby preventing the bubbles from reducing the reaction efficiency of the electrolysis process. In addition, the electrolytic device of the present invention can also simultaneously produce high-speed fluid having micro bubble structures contained therein and generate electrolytic effects for generating oxygen and hydrogen.

The present invention provides an electrolytic device. In one embodiment, the electrolytic device is an electrolytic pump having electrode device arranged therein. The electrode device has a fluid inlet for drawing the electrolytic fluid flowing therein through a negative pressure generated by a high-speed rotation of the electrode device. After the electrolysis reaction, since the electrolytic fluid and bubbles attached onto the electrodes are thrown out of the electrode device due to the negative pressure during the rotation of the electrode device, the electrolysis reaction efficiency can be greatly improved. In another embodiment, not only can the electrode device of the electrolytic device perform the electrolytic reaction but also the electrode device can be a separation element for separating the electrolytic liquid of anode electrode and cathode electrode and be an ion exchanging membrane allowing the ionic liquid to flow between the anode and cathode thereby achieving the electrolytic reaction effect.

In one embodiment, the present invention provides a pumping device comprising a housing and an electrode device. The housing is configured to have an inlet opening at one side for allowing a first fluid flowing inside the housing, and an exhausting opening. The electrode device is arranged inside the housing. The electrode device comprises a rotating body having a flow inlet, a plurality of first flow channels, at least one first electrode, and at least one second electrode, wherein the rotating body generates a negative pressure through a rotation for drawing the first fluid to enter the plurality of the first channels through the flow inlet, the at least one first electrode and the at least one second electrode generate a electrolytic reaction with the first fluid, the first fluid and bubbles generated by the at least one first electrode and the at least one second electrode are exhausted through an outlet of each first flowing channels and the first fluid having the bubbles is exhausted out of the housing through the exhausting opening.

In one embodiment, the present invention provides an electrode device comprising a first plate, a second plate, and an isolation part. The first plate is configured to be a first electrode having a first surface. The second plate is configured to be a second electrode having a second surface opposite to the first surface. The isolation part is arranged between the first and the second electrode and connected to the first and second surfaces, wherein the isolation part further comprises a supporting plate, a plurality of first isolation structures, and a plurality of second isolation structures. The supporting plate is configured to have a third surface opposite to the first surface, and a fourth surface opposite to the fourth surface. The plurality of first isolation structures is formed between the first plate and the supporting plate, and is connected to the first and third surfaces, wherein the a first flow channel is formed between two adjacent first isolation structures for guiding a fluid. The plurality of second isolation structures is formed between the second plate and the supporting plate, and is connected to the second and fourth surfaces wherein a second flow channel is formed between two adjacent second isolation structures for guiding the fluid. The electrode device is rotated to draw the fluid to flow into the first and second flow channels such that a electrolytic reaction is generated between the first and second electrodes and the fluid.

BRIEF DESCRIPTION OF THE DRAWINGS

The present invention will now be specified with reference to its preferred embodiment illustrated in the drawings, in which:

FIG. 6A illustrates electrode device according to another embodiment of the present invention;

FIGS. 6B to 6C respectively illustrate supporting plate according to different embodiment of the present invention;

FIG. 6D illustrates electrode device according to another embodiment of the present invention.

DESCRIPTION OF THE PREFERRED EMBODIMENT

The invention disclosed herein is directed to an electrode device for electrolysis and electrolytic device and pumping device using the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1B:
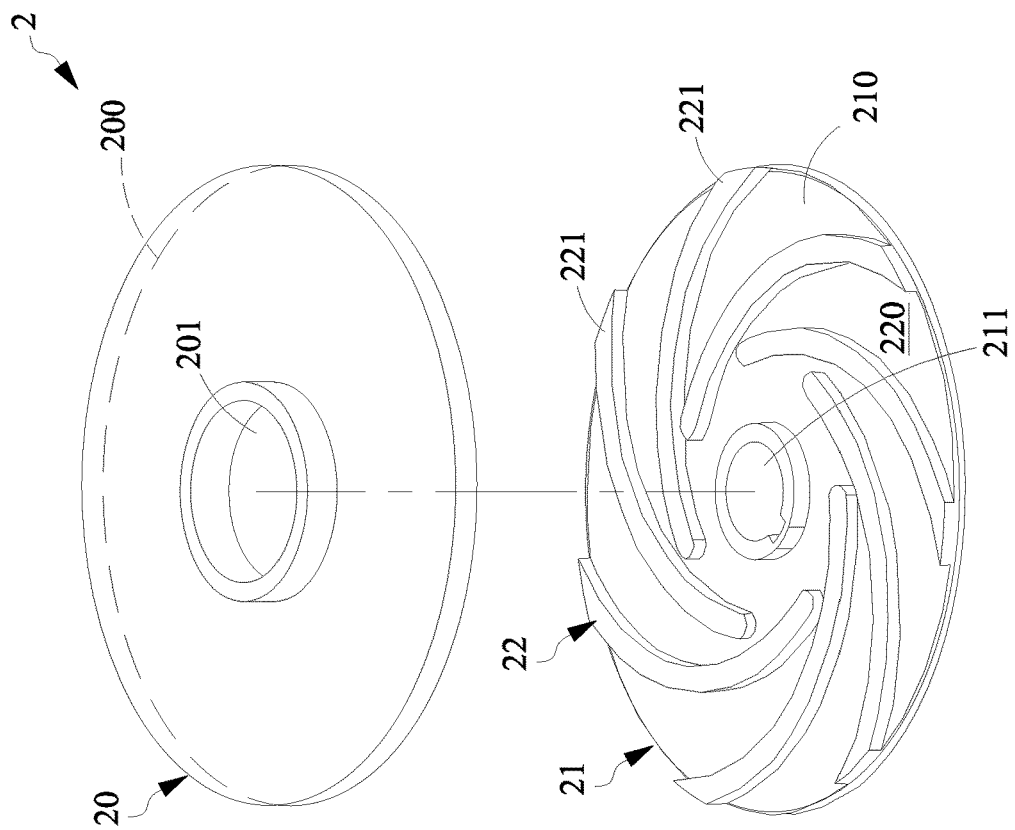
FIGS. 1A and 1B respectively illustrate a perspective view of the electrode device and partially explosive view of the electrode device according to one embodiment of the present invention.
Figure 1A:
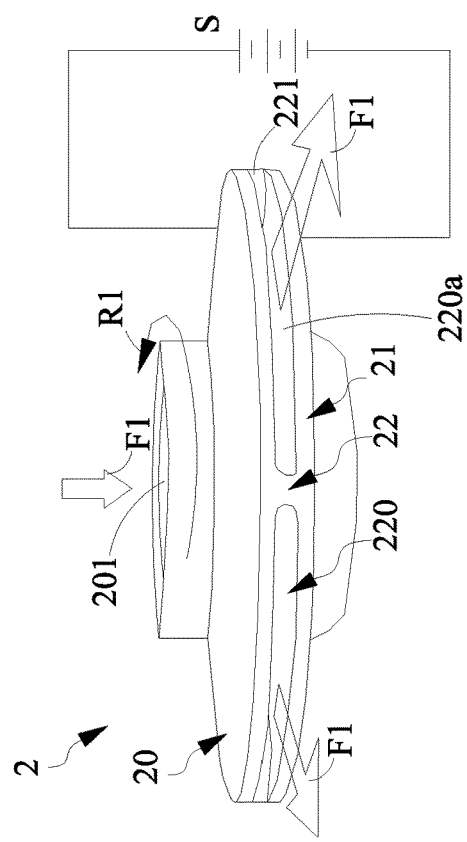

Please refer to FIGS. 1A and 1B, which respectively illustrate a perspective view of the electrode device and partially explosive view of the electrode device according to one embodiment of the present invention. In the present embodiment, the electrode device 2 comprises a rotating body formed by a first plate 20, a second plate 21, and an isolation part 22. The first plate 20 is utilized to be a first electrode having a first surface 200 and a flow inlet 201 formed at the center of the first plate 200. The second plate 21 is utilized to be a second electrode having a second surface 210 opposite to the first surface 200. The center of the second plate 21 has a connecting opening 211 for being connected to a rotating shaft (not shown). The isolation part 22 is arranged between first plate 20 and the second plate 21, and respectively connected to the first surface 200 and the second surface 210 such that the first plate 20 is isolated from the second plate 21. The isolation part 22 comprises a plurality of the first flow channels 220 respectively communicate with the flow inlet 201. Each first flow channel 220 has an exhausting outlet 220a for exhausting the fluid entering the electrode device 2.

In the present embodiment, the isolation part 22 has a plurality of isolation structures 221 and any two adjacent isolation structures 221 defined the first flow channel 220. In the present embodiment, the isolation structures 221 is a cycloid structures having cycloid profile so that the first flow channel 220 is a cycloid channel. In one embodiment, the first plate 20, the second plate 21, and the isolation part 22 formed electrode device that can generate turbine effect to draw the electrolytic fluid flowing therein. The isolation structures 221 of the isolation part 22 can be a non-conductive magnetic material or non-conductive and non-magnetic material.

Figure 1C:
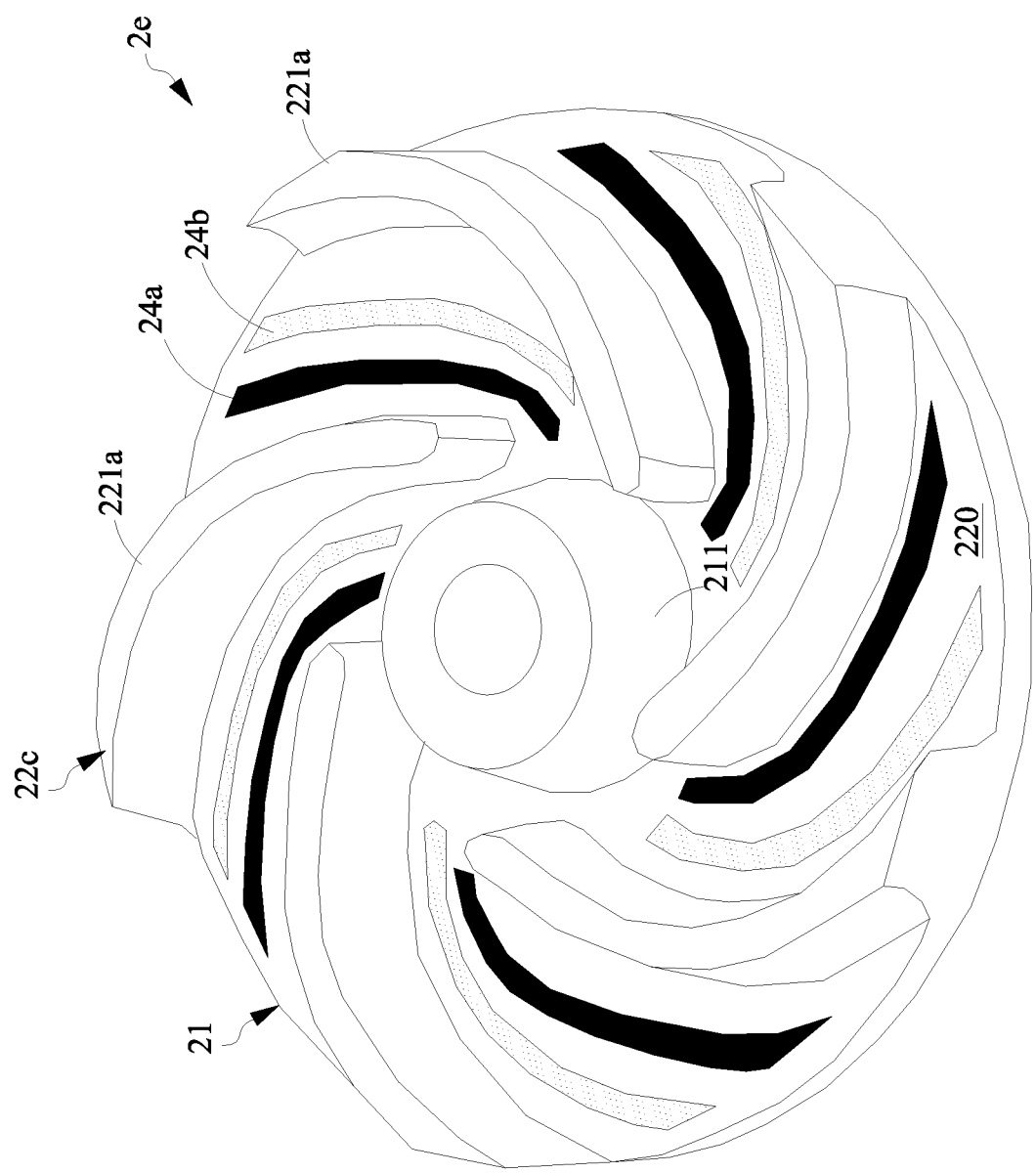
FIG. 1C illustrates another perspective view of the electrode device according to another embodiment of the present invention.

Please refer to FIG. 1C, which illustrates another perspective view of the electrode device according to another embodiment of the present invention. The electrode device 2e in the present embodiment is a rotating body having single second plate 21 and a plurality of isolation structures 22c, wherein the first flow channel 220 is formed between any two adjacent isolation structures 22c. The second plate 21 has at least one first electrode 24a and at least one second electrode 24b. In the present embodiment, at least one first electrode 24a and second electrode 24b are formed on the second plate 21 corresponding to each first flow channel 220 between any two adjacent isolation structures 22c.

Figure 2B:
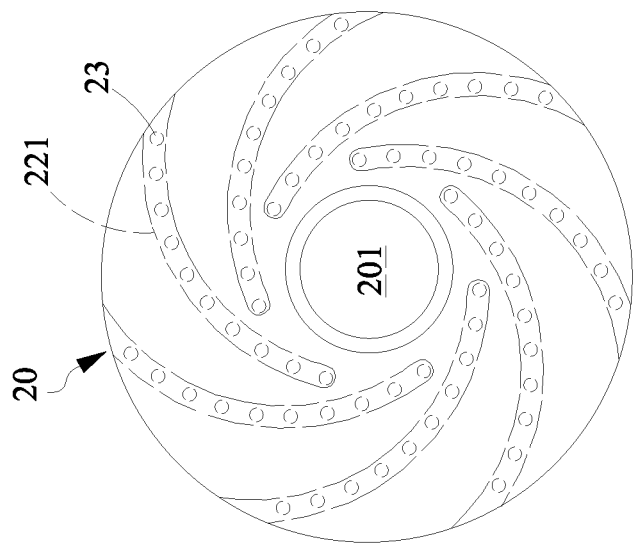
FIGS. 2A and 2B illustrate a top view of the device according to another embodiment of the present invention.
Figure 2A:
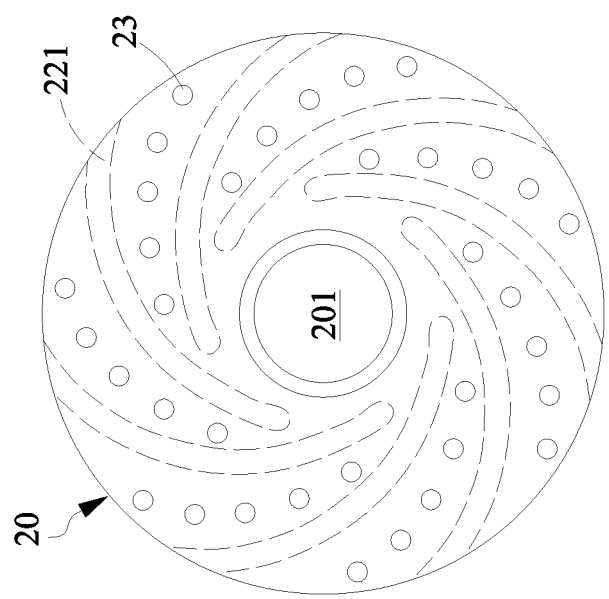

Please refer to FIGS. 2A and 2B, which illustrate a top view of the device according to another embodiment of the present invention, respectively. In the present embodiment, taking the top view of first plate 20 as one example shown in FIG. 2A, a plurality of magnetic elements 23 are formed on the first plate 20 corresponding to each first flow channel 220. In one embodiment, a plurality of through holes or blind holes corresponding to each first flow channel 220 are formed on the first plate 20 and a plurality of magnetic elements 23 are inserted into the through holes or blind holes, respectively, such that the first plate 20 having a plurality of magnetic elements 23 corresponding to each first flow channel can be formed like FIG. 2A. It is noted that although the embodiment of first plate 20 with magnetic elements 23 is shown in FIG. 2A, similarly, the second plate 21 can be formed in the same way such that a plurality of magnetic elements 23 can be formed on the second plate 21 corresponding to each first flow channel 220. In the embodiment shown in FIG. 2B, alternatively, taking first plate 20 as an example, the plurality of through holes or blind holes are formed on each isolation structures 221 and the magnetic elements 23 are inserted into the trough holes or blind holes, respectively. Likewise, the second plate 21 having magnetic elements can be formed similar to the first plate 20 shown in FIG. 2B. In addition, alternatively, the embodiments shown in FIGS. 2A and 2B can be combined together, i.e. the first plate 20, the second plate 21 and the isolation structures 220 having magnetic elements 23.

The operation principle of the electrode device 2 shown in FIGS. 1A and 1B is explained below. In the embodiment shown in FIGS. 1A and 1B, after the first plate 20 and second plate 21 of the electrode device 2 are respectively electrically connected to the positive electrode and the negative electrode of the power source S, the electrode device 2 is driven to perform a rotation R1 and the rotating electrode device 2 can generate negative pressure whereby the first fluid F1 is drawn to flow into each first flow channel 220 through the flow inlet 201 so as to start an electrolytic reaction with the first and second plates 20 and 21. The first fluid F1 is then exhausted out of the electrode device 2 from each exhausting outlet 220a of each first flow channel 220. In the present embodiment, the first fluid F1 is an electrolytic fluid having electrolytic substance which can be, but should not be limited to, NaOH, $K_2CO_3$, $Na_2CO_3$, $NaHCO_3$, $KHCO_3$, $CaCO_3$, NaCl, and $H_2SO_4$. Taking NaOH liquid as one example of the first fluid F1, when the power source S provides electrical power to electrode device 2, the hydrogen ions $H^+$ move toward the cathode thereby generating hydrogen while, at the same time, the oxygen ions $O^{2-}$ move toward the anode for generating oxygen. The accumulation of the oxygen and hydrogen generated form the electrolytic reaction will form the bubbles respectively attached onto the first and second plates 20 and 21. Conventionally, the bubbles associated with the electrolytic gases will hider the process of the electrolytic reaction. In the present embodiment, through a centrifugal force generated by the rotation R1 of the electrode device 2 will throw the bubbles attached on the electrodes out of the first plate 20 and the second plate 21 thereby maintaining the electrolytic efficiency of the electrolytic reaction.

Figure 3A:
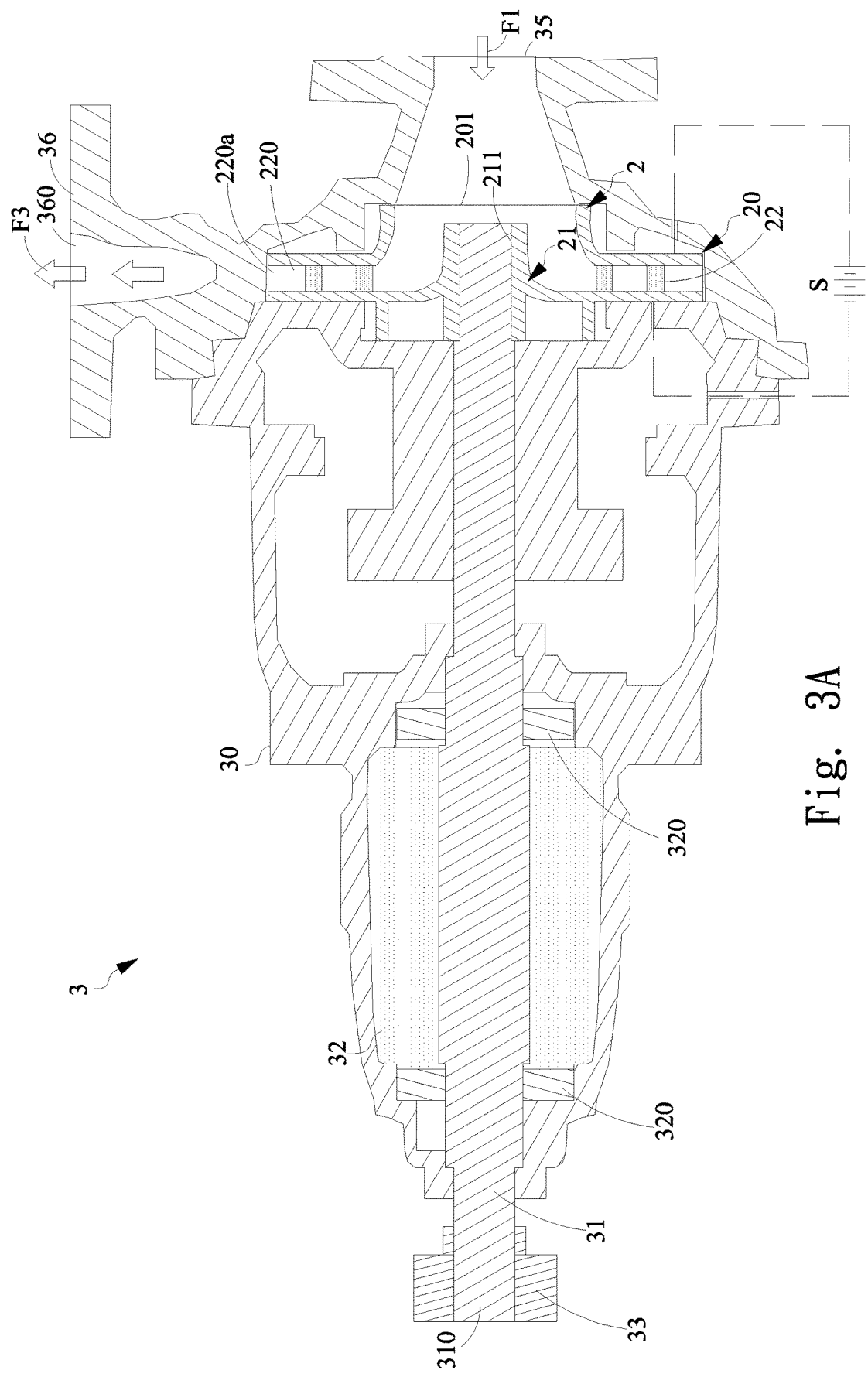
FIG. 3A illustrates an electrolytic device according to one embodiment of the present invention.

Please refer to FIG. 3A, which illustrates an electrolytic device according to one embodiment of the present invention. In the present embodiment, the electrolytic device 3 is a pump device comprising a housing 30, a rotating shaft 31, and electrode device 2. A motor 32 and bearings 320 for driving the rotating shaft 31 are arranged inside the housing 30. A supporting base 33 is arranged at one side of the housing 30 for coupling to one end 310 of the rotating shaft 31. An inlet opening 35 is formed at the other side of the housing 30 for communicating with the flow inlet 201 of the electrode device 2. The first fluid F1 flows inside the housing 30 through the inlet opening 35 and then enters the electrode device 2. It is noted that the structure of the pump device 3 is known by the one having ordinary skilled in the art and the detail of the pump device it self will not be describe hereinafter. The electrode device 2 is coupled to the rotating shaft 31. In the present embodiment, the electrode device 2 is illustrated as the structures shown in FIGS. 1A and 1B, wherein the second plate 21 is coupled to the rotating shaft 31 through the coupling opening 211.

In the following description, the operation of the FIG. 3A is explained. When the first and second plates 20 and 21 of the electrode device 2 is electrically connected to the positive electrode and negative of the power source S and the rotating shaft 31 is driven to rotate by the motor 32, the electrode device 2 is driven by the rotating shaft 31 to perform the rotation R1 whereby the first fluid F1 flows into each first flow channel 220 through the flow inlet 201 so as to start an electrolytic reaction with the first and second plates 20. The first fluid F1 is then exhausted out of the electrode device 2 from each exhausting outlet 220a of each first flow channel 220. An exhausting part 36 having an exhausting opening 360 is arranged at a lateral side of the housing 30 such that a third fluid F3 having first fluid F1 with bubbles is exhausted out of the housing 30 through the exhausting opening 360. The third fluid F3 exhausted from the exhausting opening 360 has micro bubbles contained therein. In the present embodiment, the first fluid F1 is an electrolytic fluid having electrolytic substance which can be, but should not be limited to, NaOH, $K_2CO_3$, $Na_2CO_3$, $NaHCO_3$, $KHCO_3$, $CaCO_3$, NaCl, and $H_2SO_4$. Taking NaOH liquid as one example of the first fluid F1, when the power source S provide electrical power to electrode device 2, the hydrogen ions $H^+$ move toward the cathode thereby generating hydrogen while, at the same time, the oxygen ions $O^{2-}$ move toward the anode for generating oxygen. The accumulation of the oxygen and hydrogen generated form the electrolytic reaction will form the bubbles respectively attached onto the first and second plates 20 and 21. Conventionally, the bubbles associated with the electrolytic gases will hider the process of the electrolytic reaction. In the present embodiment, through a centrifugal force generated by the rotation R1 of the electrode device will throw the bubbles attached on the electrodes, i.e. the first and second plates 20 and 21, out of the electrode device 2 thereby maintaining the electrolytic efficiency of the electrolytic reaction.

Figure 3B:
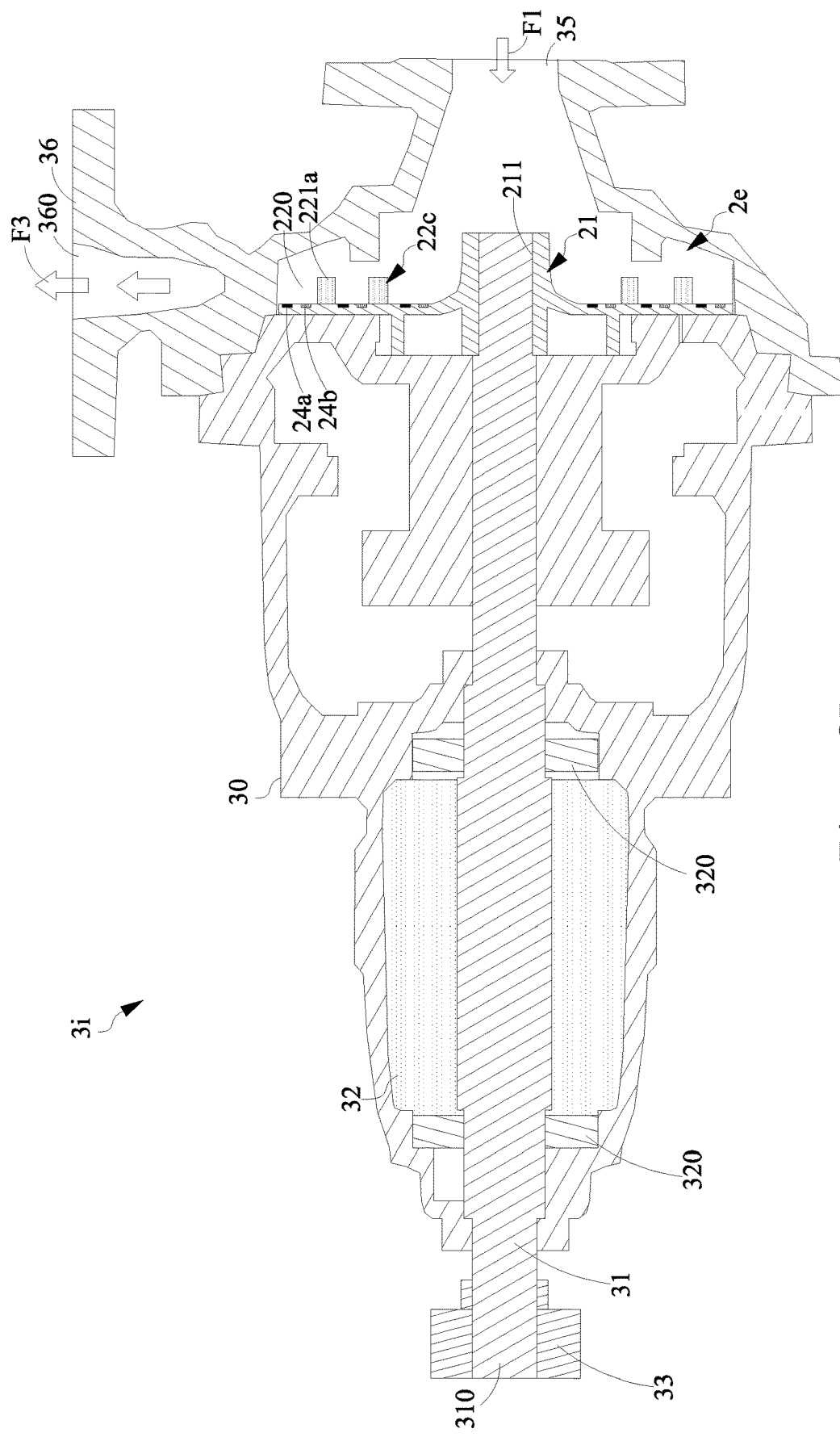
FIG. 3B illustrates an electrolytic device according to another embodiment of the present invention.

Please refer to the FIG. 3B, which illustrates an electrolytic device according to another embodiment of the present invention. Basically, the electrolytic device 3i is similar to the electrode device shown in FIG. 3A, the different part is that the electrode device utilized herein is the electrode device 2e shown in FIG. 1C. Unlike the electrode device 2 having two opposite first plate 20 and second plate 21 shown in FIG. 3A, the electrode device 2e utilized single second plate 21 having a first electrode 24a and a second electrode 24b formed on the second plate 21 corresponding to the first flow channel 220 defined by the two adjacent isolation structures 221a, wherein the first electrode 24a is positive electrode and the second electrode 24b is negative electrode. In the present embodiment, the first and second electrodes 24a and 24b are respectively the cycloid structures embedded into the second plate 21. It is noted that the profile of the first and second electrodes 24a and 24b are not limited to the cycloid shape. For example, alternatively, the first and second electrodes 24a and 24b can be a straight bar structures. In addition, it is not limited to a single pair of the first and second electrodes 24a and 24b formed on or in the second plate 21 corresponding to each first flow channel 220. In another embodiment, a plurality pairs of first and second electrodes 24a and 24b are formed on or in the second plate 21 corresponding to the first flow channel 220. In the embodiment shown in FIG. 3B, since the first electrode 24a and the second electrode 24b are formed on the same plane of the second plate 21, the distance therebetween can be shortened and the intensity of the electrical field can be increased thereby improving the electrolytic efficiency of the electrolytic reason and increasing the production of the micro bubbles such that the micro bubbles contained in the third fluid F3 exhausting from the electrode device 3i can be increased.

Figure 4A:
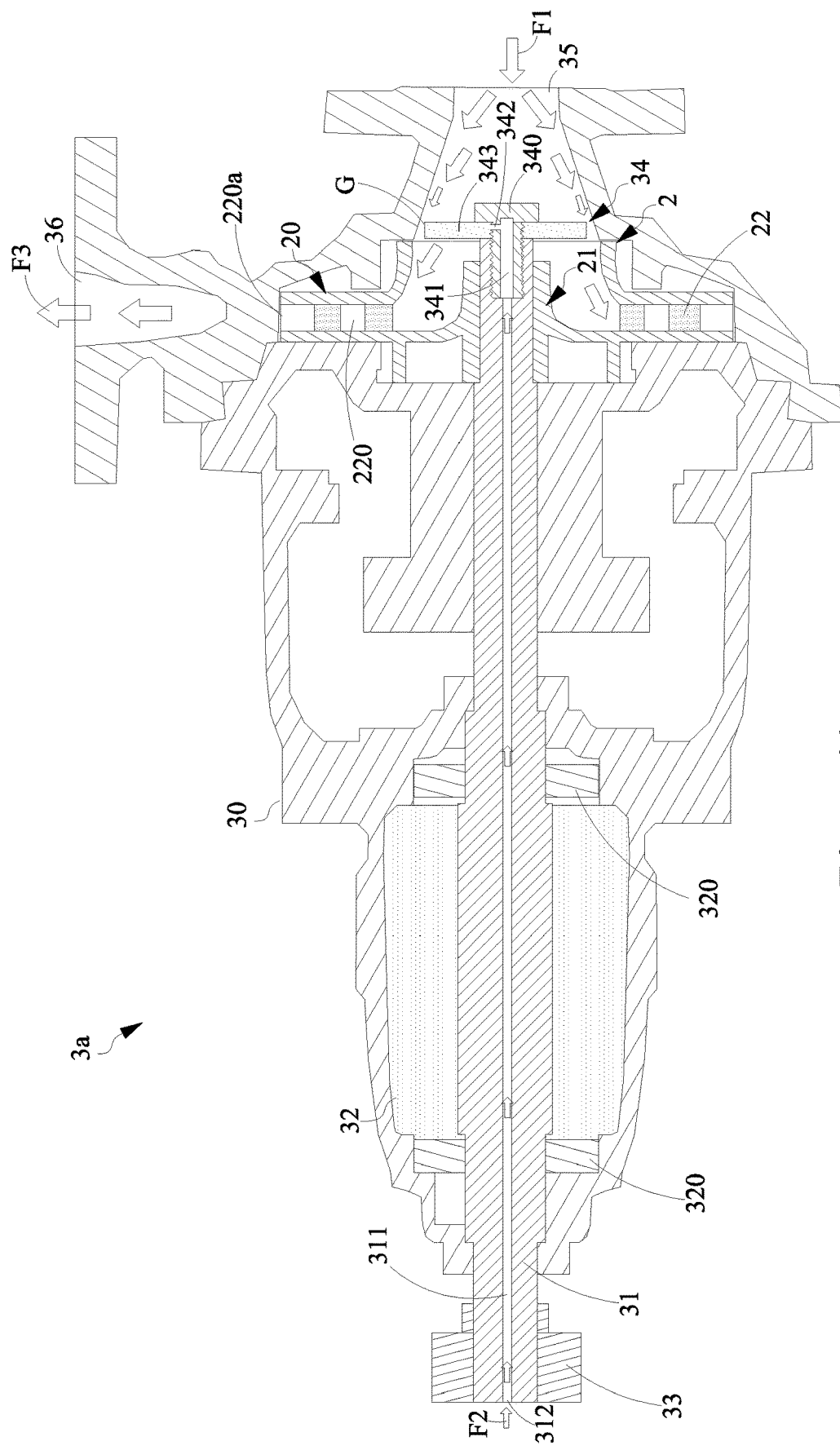
FIG. 4A illustrates an electrolytic device according to another embodiment of the present invention.

Please refer to FIG. 4A which illustrates an electrolytic device according to another embodiment of the present invention. Basically the electrolytic device 3a is similar to the device shown in FIG. 3A, the different part is that the bubble quantity can be increased whereby the micro bubbles in the third fluid F3 are further increased. In the preset embodiment, a first hollow channel 311 is formed inside the rotating shaft 31 for guiding the second fluid F2. In the present embodiment, the second fluid F2 is a gas which can be, but should not be limited to, air, oxygen, carbon dioxide or ozone. The second fluid F2 enters into the first hollow channel 311 from a terminal opening 312 of the first hollow channel 311.

A gas supplier 34 is arranged on one end of the rotating shaft 31. The gas supplier 34 further comprises an engaging element 340 and a porous plate 343. The engaging element 340 further comprises a guiding channel 341 formed inside the engaging element 340, wherein one end of the guiding channel 341 is connected to the porous plate 343 while the other end of the guiding channel 341 is communicated with the first hollow channel 311 such that the second fluid F2 flowing into the first hollow channel 311 can be guided into the guiding channel 341. The second fluid F2 inside the guiding channel 341 then enters the first flow channel 220 of the electrode device 2 through the porous plate 343. In the present embodiment, the axial direction of the guiding channel 341 is the same as the axial direction of the first hollow channel 311. In the present embodiment, the engaging element 340 is connected to the rotating shaft 31 though the threads formed on the peripheral of the engaging element 340.

The porous plate 343 is fixed by the engaging element 340. In the present embodiment, one surface of the porous plate 341 is secured by one end of the engaging element 340 while the other surface is leaned against the rotating shaft 31 so that the porous plate 343 can be fixed onto the rotating shaft 31 by the engaging element 340. The porous plate 343 is connected to the guiding channel 341 for receiving the second fluid F2. In the present embodiment, the engaging element 340 is communicated with the porous plate 343 for receiving the second fluid F2 through a sub flow channel 342. It is noted that, the way that making the engaging element 340 communicate with the porous plate 343 is not limited to the embodiments shown in the figures. The one having ordinary skilled in the art can selecting proper ways to make the engaging element 430 communicate with the porous plate 343 according to the user need. In the present embodiment, the porous plate 343 is arranged inside the inlet opening 35. When the engaging element 340 is engaged with the end of the rotating shaft 31, a gap G is formed between the porous plate 343 and the inner wall of the inlet opening 35 for allowing the first fluid F1 enters into the electrode device 2, wherein the second fluid F2 enters into the sub flow channel 342 through the first hollow channel 311 and guiding channel 341, the second fluid F2 further enters the porous plate 343 through the sub flow channel 342 and then is exhausted from the peripheral of the porous plate 343.

Simultaneously, the second fluid F2 can be drawn into the first hollow channel 311 inside the rotating shaft 31 due to the negative pressure generated by the rotation R1. The second fluid F2 then enters the porous plate 343. Since the porous plate 343 is engaged with the rotating shaft 31, when rotating shaft 31 is rotated, the porous plate 343 is rotated to generate the centrifugal force. The farer distance away from the center of the porous plate 343 it is, the larger the centrifugal force it becomes. Due to the centrifugal force generated by the porous plate 343, the second fluid F2 can be exhausted from the porous plate 343 through the lateral surface along the axial direction. The second fluid F2 exhausted from the porous plate 343 is then cut by the first fluid F1 passing through the gap G whereby the second fluid F2 is physically transformed into a plurality of micro bubbles. The micro bubbles mixed with the first fluid F1 enters the electrode device 2, and then the first fluid F1 with the plurality of micro bubbles enters the plurality of first flow channels 220 and is exhausted out of the electrode device 2 through the centrifugal force generated by the rotation of the electrode device 2. The mixture of micro bubbles and the first fluid F1 forms the third fluid F3 and the third fluid F3 is exhausted out of the housing 30 from the exhausting opening 360 of the exhausting part 36.

Figure 4B:
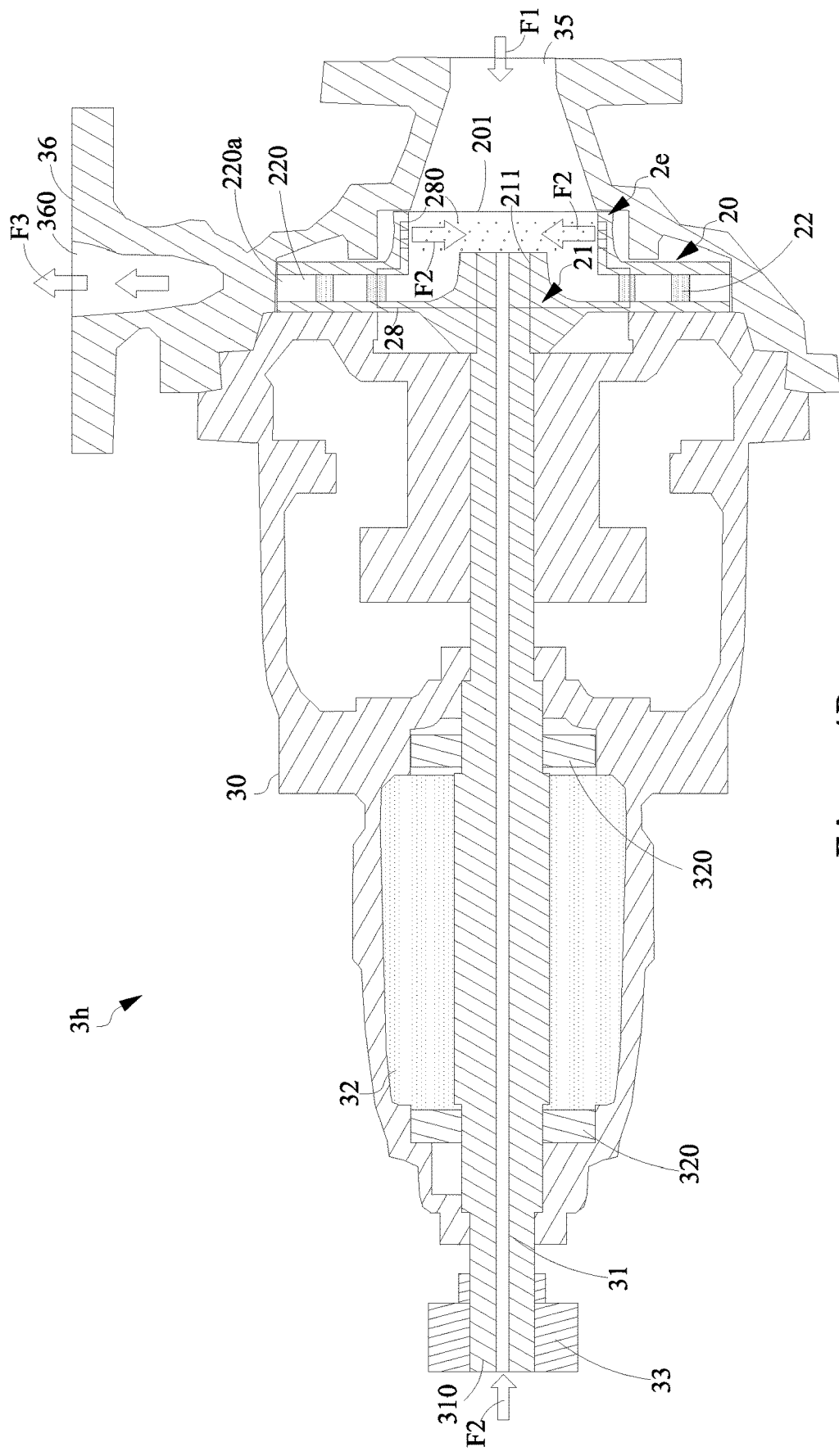
FIG. 4B illustrates an electrolytic device according to another embodiment of the present invention.

Please refer to FIG. 4B, which illustrates an electrolytic device according to another embodiment of the present invention. In the present embodiment, the electrolytic device 3h is basically similar to the embodiment shown in FIG. 4A. The different part is that the electrode device 2e further comprises a gas channel 28 which passes through the second plate 21, isolation part 22, and the first plate 20, and finally communicates with the flow inlet 201. In the present embodiment, one end of the gas channel 28 is formed inside the second plate 21 and is communicated with the first hollow channel 311 such that the second fluid F2 inside the first hollow channel 311 can flow into the gas channel. It is noted that although the architecture shown in FIG. 4A comparing with the embodiment shown in FIG. 3A can further increase the quantity of micro bubbles contained within the first fluid F1, the gap G is spatially limited between the porous plate 343 and the flow inlet 201 so that the first fluid F1 enters the electrode device 2 will be reduced due to the resistance generated from the insufficient space of gap G thereby affecting the quantity of the micro bubbles formed by the second fluid F2. However, in the embodiment shown in FIG. 4B, a plurality through holes 280 formed around the wall defining the flow inlet 201 can be communicated with the gas channel 28 so that the gas channel 28 can communicate with the flow inlet thereby reducing the resistance between the first fluid F1 and the second fluid F2. Therefore, the quantity of micro bubbles contained in the first fluid F1 can be effectively increased.

Next, the operation of the embodiment shown in FIG. 4B is explained. When the electrode device 2e is rotated through the driving of the rotating shaft 31, the second fluid F2 can be drawn into the first hollow channel 311 formed inside the rotating shaft 31. The second fluid F2 further enters the gas channel 28. Since the gas channel 28 is communicated with the flow inlet 201, when the rotating shaft 31 is rotated, the drawn second fluid F2 inside the gas channel 28 is exhausted from the through holes 280. The exhausted second fluid F2 is cut by the first fluid F1 drawn from the inlet opening 35 so as to form a plurality of micro bubbles. The micro bubbles are then mixed with the first fluid F1 so as to form the third fluid F3 entering the electrode device 2e. Since the electrode device e2 is also rotated, the centrifugal force generated by the rotation of electrode device 2e pushes the third fluid F3 out of the electrode device 2e through the first flow channel 220. The third fluid F3 is then exhausted out of the housing 30 from the exhausting opening 360 of the exhausted part 36. It is noted that since the first fluid F1 can cut the second fluid F2 into the micro bubbles in the flow inlet 201 in advance, and the third fluid F3 inside the electrode device 2e can also have electrolytic reaction with the electrode device 2e thereby generating hydrogen bubbles and oxygen bubbles, the micro bubbles in the third fluid F3 are greatly increased because it contains the micro bubbles originated from the second fluid F2 and oxygen bubbles and hydrogen bubbles generated by the electrolytic reaction. Accordingly, the electrolytic device 3h comparing with the device shown in FIG. 3A, 3B or 4A, can greatly improve the quantity of micro bubbles.

Figure 5A:
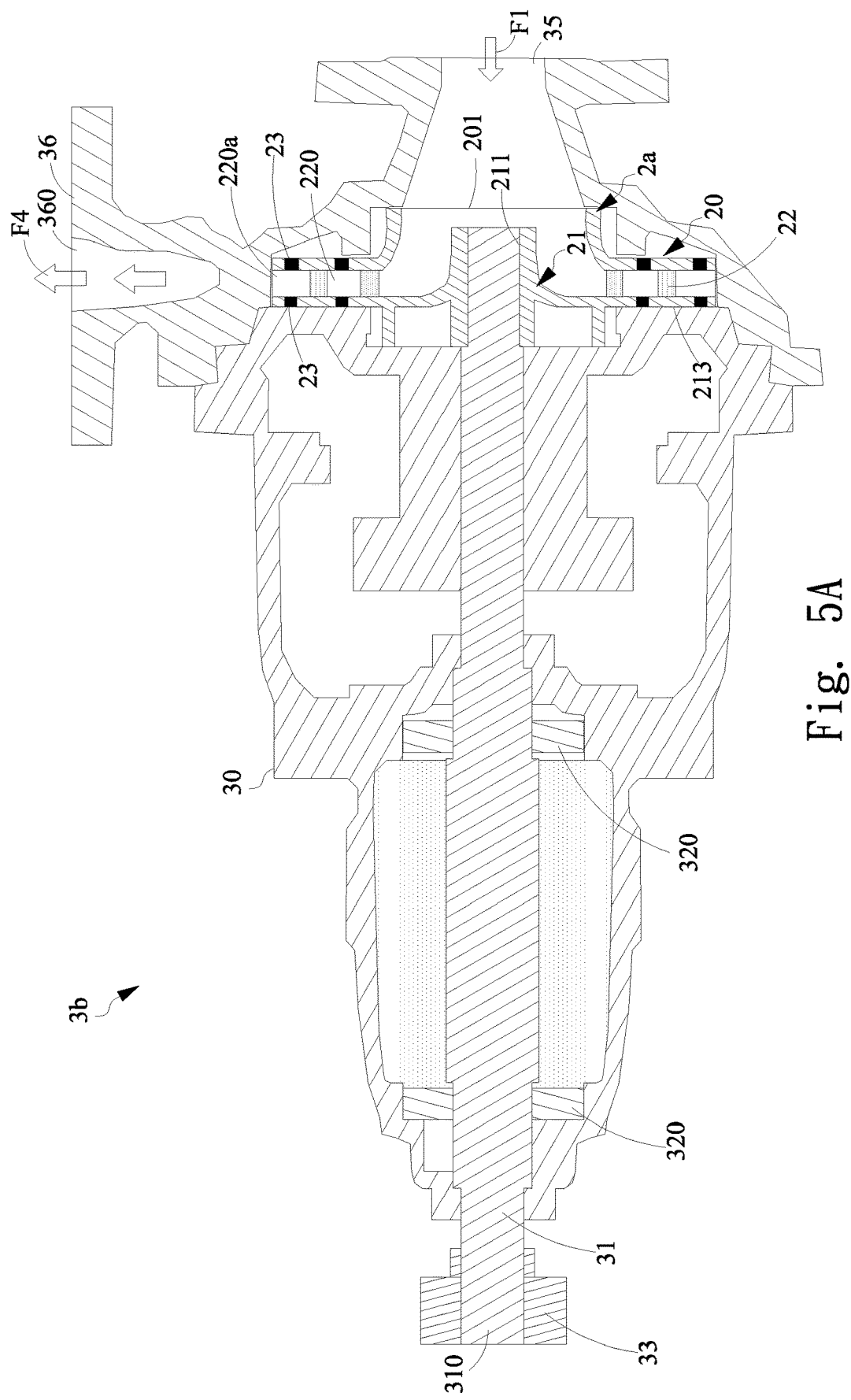
FIGS. 5A to 5C respectively illustrate electrolytic device according to different embodiment of the present invention.

Please refer to FIG. 5A, which illustrates electrolytic device according to one embodiment of the present invention. In the embodiment shown in FIG. 5A, it is basically similar to the embodiment shown in FIG. 3A. The different part is that the electrode device 2a shown in FIG. 2A is utilized in the electrolytic device 3b of the present embodiment. In the present embodiment, a plurality of magnetic elements 23 are respectively formed on the first and second plates 20 and 21 corresponding to the first flow channel 220 thereby the first fluid F1 enters the electrode device 2a can be magnetized such that a fourth fluid F4 exhausted from the exhausting opening 360 of the exhausting part 36 comprises magnetized fluid and micro bubbles. The fourth fluid F4 can be utilized in different kinds of industry, agriculture and household fields. In addition, please see the embodiment shown in FIG. 5B, in the present embodiment, the electrolytic device 3c is basically similar to the electrolytic device 3a shown in FIG. 4A. The different part is that the electrode device 2a shown in FIG. 2A is utilized in the electrolytic device 3c of the present embodiment. In the present embodiment, a plurality of magnetic elements 23 are respectively formed on the first and second plates 20 and 21 corresponding to the first flow channel 220 whereby the first fluid F1 enters the electrode device 2a can be magnetized such that a fourth fluid F4 exhausted from the exhausting opening 360 of the exhausting part 36 comprises magnetized fluid and micro bubbles. It is noted that since there has a gas generation part 34, the second fluid F2 can be guided into the electrode device 2a whereby the micro bubbles in the embodiment shown in the FIG. 5B can be more than the micro bubbles generated by the FIG. 5A.

Figure 5B:
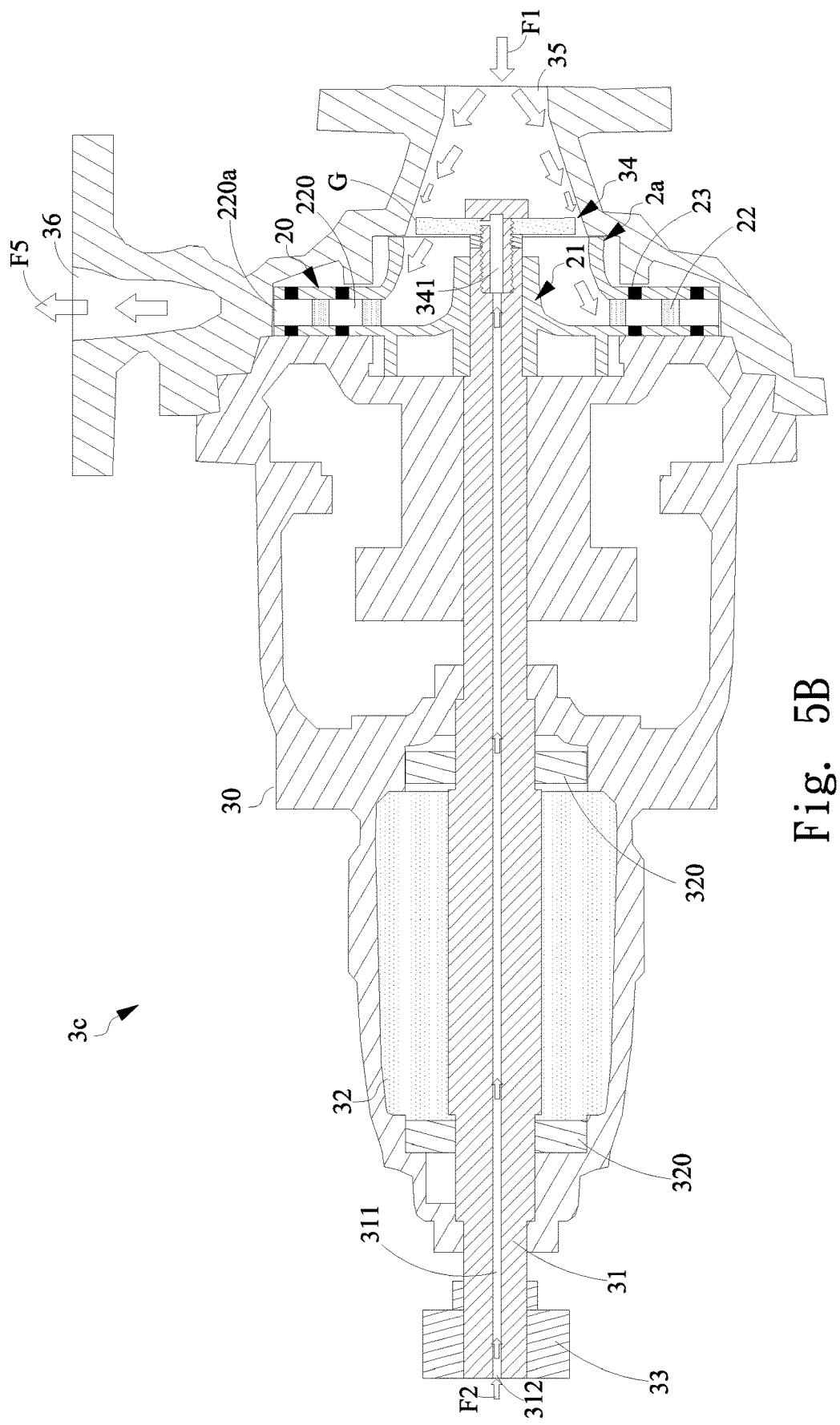
Figure 5C:
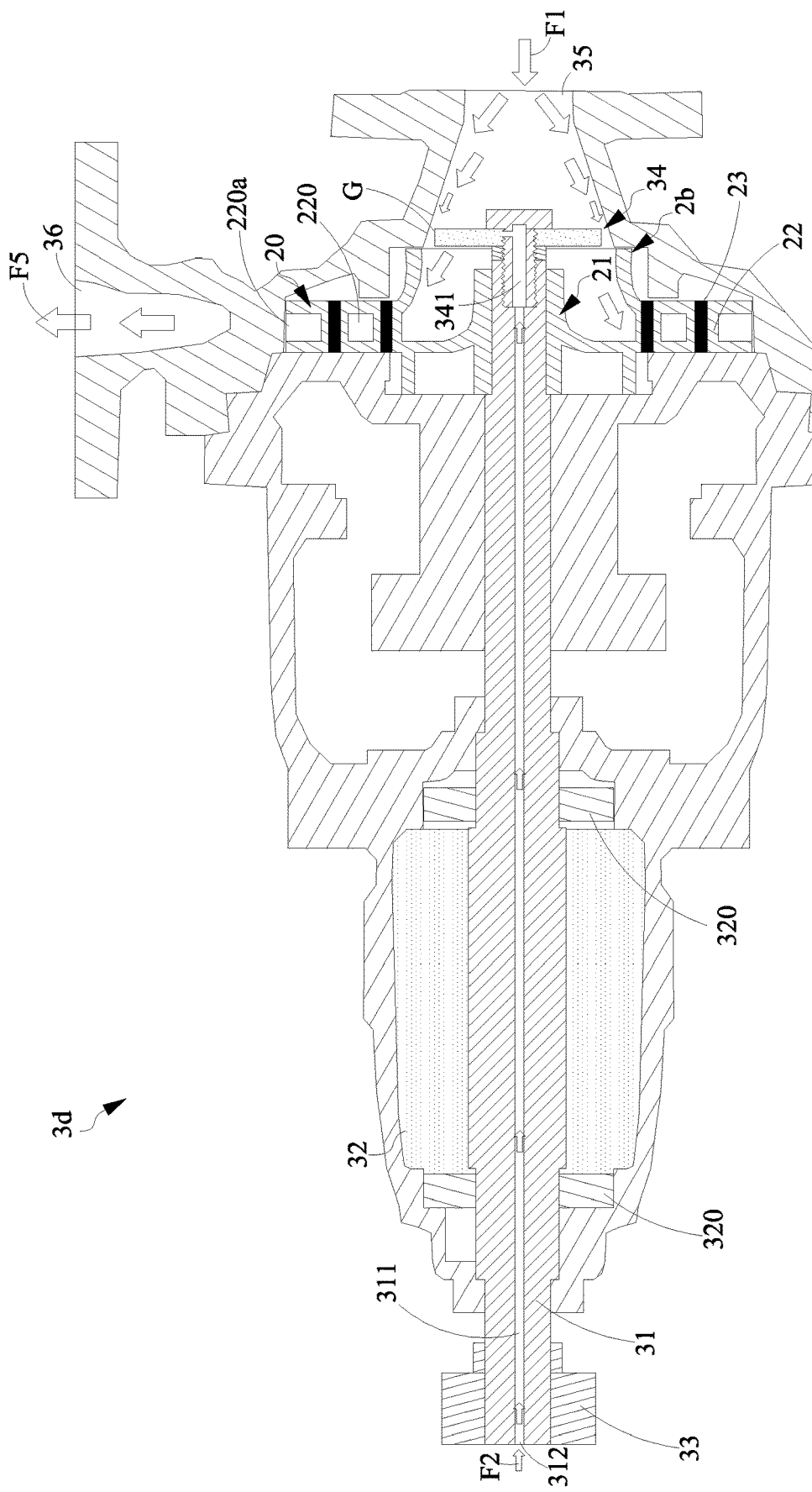

Alternatively, in the embodiment shown in FIG. 5C, basically, the electrolytic device 3d is similar to the embodiment shown in FIG. 5B, and the different part is that the electrode device 2b shown in FIG. 5C is the electrode device shown in FIG. 2B wherein a plurality of magnetic elements 23 are formed in each isolation structures 221 of isolation part 22 sandwiched between the first and second plates 20 and 21 thereby magnetizing the first fluid F1 flowing into the electrode device 2b so that the exhausting fifth fluid F5 can posses both magnetized property and a plurality of micro bubbles contained inside the fluid F5. It is noted that, since there has a gas generation part 34 for guiding the external second fluid F2 into the electrode device 2b, the micro bubbles generated by the present embodiment is more than the micro bubbles generated by the embodiment shown in FIG. 5A.

Please refer to FIG. 6A, which illustrates the electrode device according to another embodiment of the present invention. In the present invention, the electrode device 2c comprises a first plate 20, a second plate 21 and an isolation part 22a. The first plate 20 has a first surface 200 and a flow inlet 201. The second plate 21 has a second surface 210 opposite to the first surface 200. The isolation part 22a is arranged between the first and second plates 20 and 21 and is connected to the first and second surfaces 200 and 210.

The isolation part 22a further comprises a supporting plate 222, a plurality of first isolation structures 225 and a plurality of second isolation structures 226. The supporting plate 222 has a third surface 223 opposite to the first surface 200, and a fourth surface 224 opposite to the second surface 210. The supporting plate 222, in the present embodiment, is a metal plate made of the metal material. In order to keep the ions smoothly flowing between the first plate 20 and second plate 21, in the preset embodiment, the supporting plate 222 is a porous structures or metal plate having a plurality of through holes formed thereon. Alternatively, the supporting plate 222 can also be made by the porous non-metal material or non-metal material having a plurality of through holes. The plurality of first isolation structures 225 are formed between the first plate 20 and the supporting plate 222 and are respectively connected to first surface 200 and third surface 223, wherein two adjacent first isolation structures 225 constitute the first flow channel 220. The plurality of second isolation structures 226 are formed between the second plate 21 and the supporting plate 222 and are respectively connected to second surface 210 and fourth surface 224, wherein two adjacent second isolation structures 226 constitute the second flow channel 227. It is noted that the first isolation structures 225 and the second isolation structures 226 are structures having cycloid profiles such that the first flow channels 220 and the second flow channels 227 are channels having cycloid profiles.

In the present embodiment, the second plate 21 further coupled to a first rotating shaft 25 coupled to a rotation power source 8, such as motor, for example for receiving the driving force provided by the rotation power source 8 thereby rotating the electrode device 2c. The first rotating shaft 25 has a first hollow channel 250 and a plurality of branch channels 251, wherein one end of the branch channels 251 is connected to the first hollow channel 250 and the other end of the branch channels 251 is communicated with the external environment. In the present embodiment, the peripheral of the supporting plate 222 is coupled to the supporting guide 80 which is a ring structure corresponding to the peripheral of the supporting plate 222 and supports the supporting plate 222 during the rotation of the supporting plate 222. It is noted that there has a tiny gap between the supporting plate 22 and supporting guide 80 for keeping the supporting plate 22 from interfering with the supporting guide 80 during the rotation. It is noted that the supporting guide 80 is not the necessary element for implementing the present embodiment. In another words, the supporting guide 80 can be neglected in another embodiment.

Next, the principle of operation with respect to the FIG. 6A is explained below. When the first plate 20 and the second plate 21 of the electrode device 2c are electrically connected to the electrical power source, and the electrode device 2c starts to rotate by the driving of the rotation power source 8, the fluid is drawn to enter each first flow channel 220 through the flow inlet 201. In addition, the fluid outside the first rotating shaft 25 can be drawn into the second flow channels 227 through the branch channels 251 and the first hollow channel 250. Since there has porosity or through holes on the supporting plate 222, fluid in the first flow channel 220 and second flow channel 227 start to generate the electrolytic reaction with the first and second plates 20 and 21. It is noted that since the first and the second plates 20 and 21 are respectively electrically connected to the positive and negative electrodes of electrical power, an electrical field is formed between the first and second plates 20 and 21. According to the equation (1) shown below, the intensity of the electrical field E is determined according to the voltage provided by the power source and the distance (d) between the first and the second plates 20 and 21.

According to the equation (1), if the supporting plate 222 is a conductive metal, such as shown in FIG. 6B, and is arranged at the center position between the first and second plates 20 and 21. The induced electrical field (E) will be generated between the third surface 223 of the supporting plate 222 and the first plate 20; likewise, the induced electrical field will also be generated between the fourth surface 224 of the supporting plate 222 and the second plate 21. Under the stable voltage provided without any variation, the distance is one-half short such that the electrical field between the first and the second plates 20 and 21 becomes two times stronger, thereby increasing the efficiency of the electrolytic reaction.

Please refer to FIG. 6C, which illustrates electrode device according to another embodiment of the present invention. In the present invention, the electrolytic liquid in each cathode and anode are separated from each other. The ionic exchanging membrane, such as positive ionic exchanging membrane and negative ionic exchanging membrane, for example, is utilized to establish ionic channel between the cathode and anode. The electrode device 2d comprises a first plate 20, a second plate 21 and isolation part 22b. The first plate 20 has a first surface 200 and a flow inlet 201. The second plate 21 has a second surface 210 opposite to the first surface 200. The isolation part 22b is arranged between the first plate 20 and the second plate 21, and is connected to the first surface 200 and the second surface 210, respectively.

The isolation part 22b further comprises a supporting plate 222b, a plurality of first isolation structures 225 and a plurality of second isolation structures 226. The supporting plate 222a has a third surface 223 corresponding to the first surface 200, and a fourth surface 224 corresponding to the second surface 210. The plurality of first isolation structures 225 are formed between the first plate 20 and the supporting plate 222b, and are connected to the first and third surfaces 200 and 223, respectively, wherein any two adjacent first isolation structures 225 constitutes the first flow channel 220. The plurality of second isolation structures 226 are formed between the second plate 21 and the supporting plate 222b, and are connected to the second and fourth surfaces 210 and 224, respectively, wherein any two adjacent second isolation structures 226 constitutes a second flow channel 227. It is noted that the first isolation structures 225 and the second isolation structures 226 are structures having cycloid profiles such that the first flow channels 220 and the second flow channels 227 are channels having cycloid profiles.

In the present embodiment, the supporting plate 222b is made of metal material and a plurality of holes 2220 are formed on the supporting plate 222b. In addition, a first exchanging membrane 228 is arranged on the third surface 223 of the supporting plate 222, while a second exchanging membrane 229 is arranged on the fourth surface 224 of the supporting plate 222. Please refer to FIG. 6D, in which the first exchanging membrane 228 and the second exchanging membrane 229 are capable of allowing the ions move in and move out such that the positive ions and negative ions of the first fluid and the second fluid passing through the first flow channel 220 and the second flow channel 227 can be exchanged but the communication between the first fluid and second fluid can be effectively avoided. It is noted that, in one embodiment, the supporting plate 22b can be a porous metal plate or a metal plate having a plurality of holes 2220 formed thereon through mechanical machining or chemical manufacturing process.

Figure 7A:
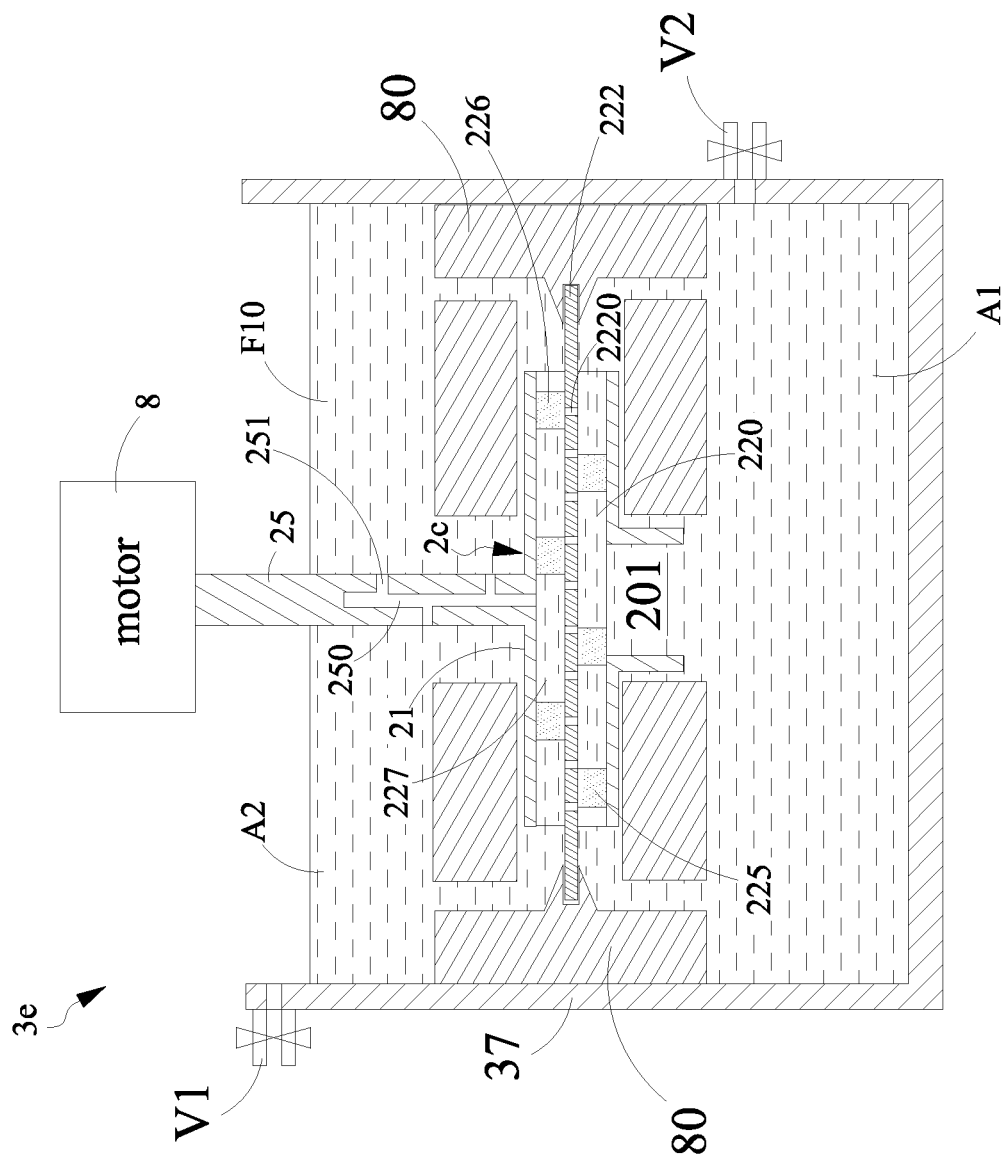
FIGS. 7A to 7C respectively illustrate electrolytic devices according to different embodiment of the present invention.

Please refer to the FIG. 7A, which illustrates another electrolytic device according to one embodiment of the present invention. In the present embodiment, the electrolytic device 3e has electrode device 2c shown in FIG. 6A. The electrolytic device 3e comprises container 37 having two control valves V1~V2. The electrode device 2c arranged inside the container 37 divides the internal area of the container 37 into a first liquid area A1 and a second liquid area A2 communicating with the first liquid area A1. The fluid F10 inside the first liquid area A1 enters the first flow channel 220 from the flow inlet 201 and is exhausted out of the first flow channel 220. The fluid F10 inside the second liquid area A2 enters the second flow channel 227 from the branch channels 251 and first hollow channel 250 and is exhausted out of the second flow channel 227.

Figure 7B:
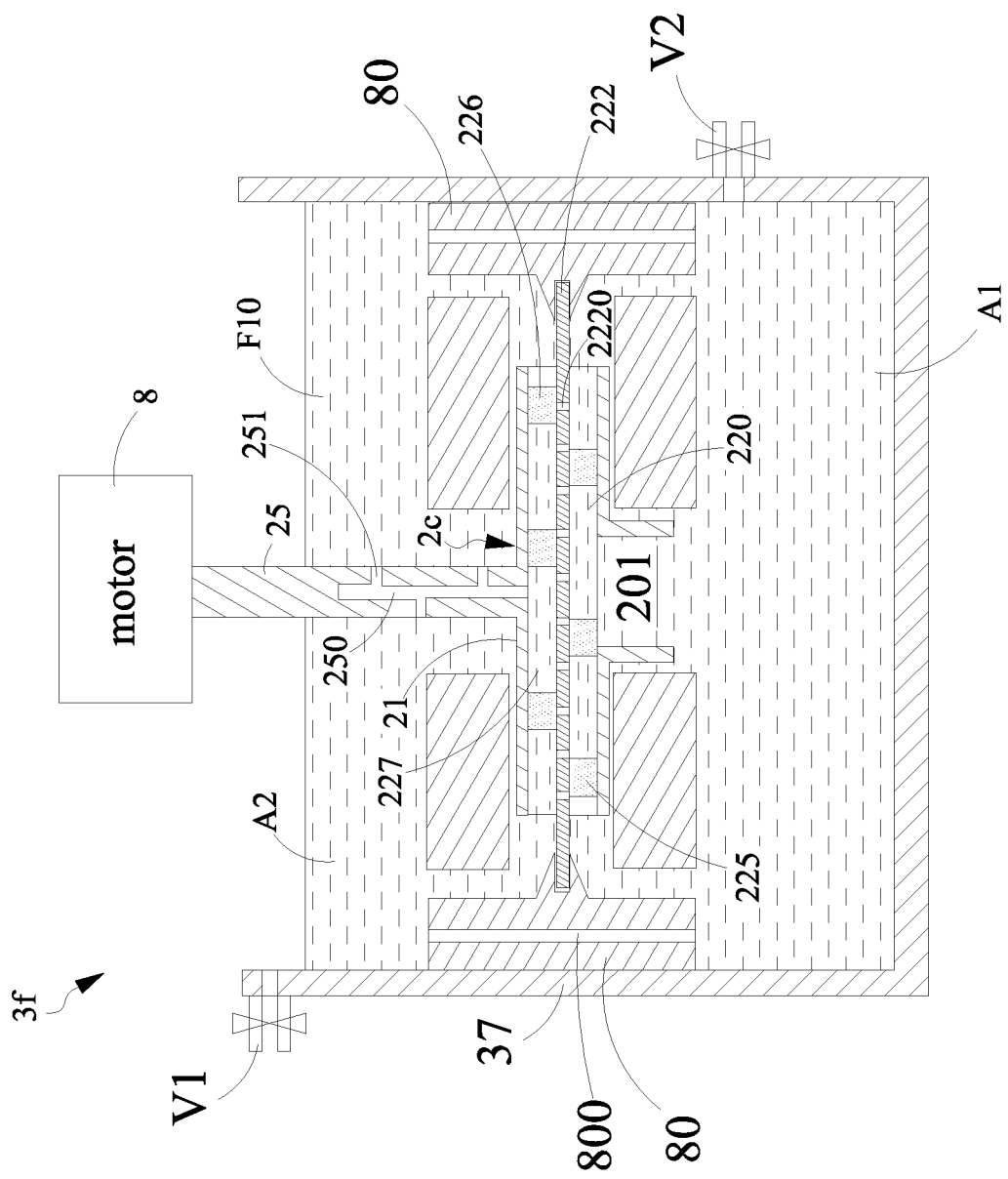

In the present embodiment, the fluid F10 is an electrolytic fluid having electrolytic substance which can be, but should not be limited to, NaOH, $K_2CO_3$, $Na_2CO_3$, $NaHCO_3$, $KHCO_3$, $CaCO_3$, NaCl, and $H_2SO_4$. The on/off associated with the control vale V1 is utilized to control the quantity of fluid flowing into the container 37 while the on/off associated with the control vale V2 is utilized to control the quantity of the fluid having micro bubbles exhausted out the container 37. In the present embodiment, the first plate 20 is utilized to be the anode, and the second plate 21 is utilized to be the cathode. When the electrolytic device is operated, the first plate 20 and the second plate 21 are provided the electrical power while the electrode device 2d is driven to be rotated. In the electrolytic reaction, the first plate 20 and fluid F10 are reacted to generate oxygen, and the second plate 21 and the fluid F10 are reacted to generate hydrogen. The oxygen and hydrogen are thrown out of the electrode device 2c through the rotation of the electrode device 2c and are mixed with the fluid F10. The fluid F10 having the oxygen and the hydrogen bubbles are exhausted through the control valve V2. It is noted that in addition to communicating with the fluid F10 between the first plate 20 and the second plate 21 through the porosity or holes formed on the supporting plate 222, alternatively, as shown in FIG. 7B, the electrolytic device 3f further has at least one communicating channel 800 formed on the supporting guide 80 for allowing the communication of the fluid F10 between the first liquid area A1 and the second liquid area A2 thereby improving the communicating effect of fluid F10 between the first and second plates 20 and 21.

Figure 7C:
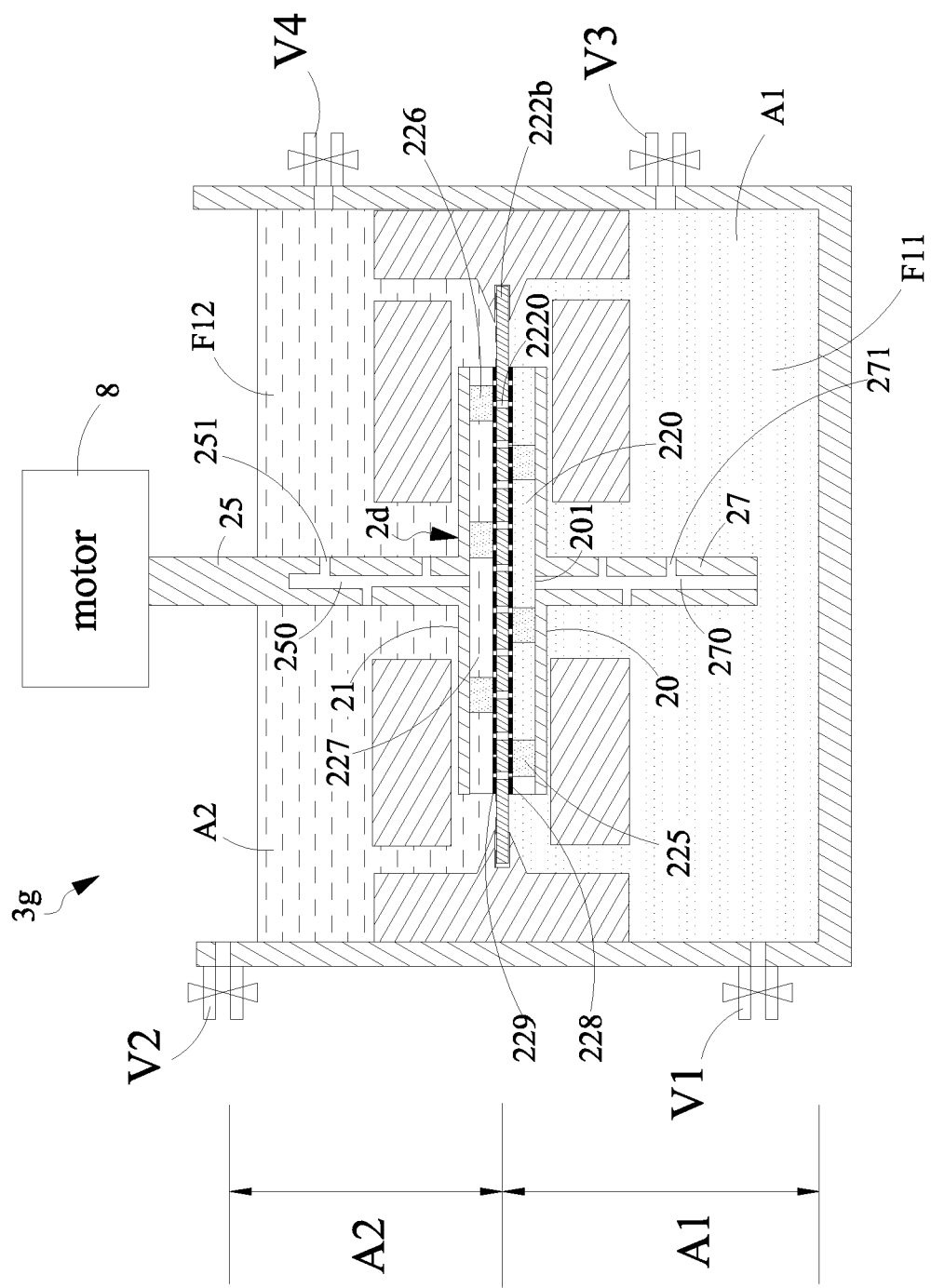

Please refer to FIG. 7C, which illustrates electrolytic device according to another embodiment of the present invention. In the present embodiment, the electrolytic device 3g has electrode device 2d shown in FIG. 6C. The electrolytic device 3g has a container 37 comprising four control valves V1~V4. The electrode device 2d arranged inside the container 37 divides the internal area of the container 37 into a first liquid area A1 and a second liquid area A2, wherein the ions can be allowed to communicate with each other between the first liquid area A1 and the second liquid area A2 while the fluid in the first liquid area A1 and the second liquid area A2 can't communicate with each other.

The first reaction fluid F11 inside the first liquid area A1 passes through the first flow channel 220, and is exhausted from the first flow channel 220 through the rotation of the electrode device 2d. Finally, the first reaction fluid F11 returns to the first fluid area A1. The second reaction fluid F12 inside the second liquid area A2 passes through the second flow channel 227, and is exhausted from the second flow channel 227 through the rotation of the electrode device 2d. Finally, the second reaction fluid F12 returns to the second fluid area A2.

In addition, in the present embodiment, the first plate 20 is coupled to a second rotating shaft 27. The second rotating shaft 27 has a second hollow channel 270 and a plurality of branch channels 271. The plurality of branch channels 271 is communicated with the second hollow channel 270 and external environment, i.e. the first liquid area A1. In the present embodiment, the peripheral of the supporting plate 222 is coupled to the supporting guide 80 which is a ring structure corresponding to the peripheral of the supporting plate 222 and supports the supporting plate 222 during the rotation of the supporting plate 222. In the present embodiment, the fluid F11 is an electrolytic fluid having electrolytic substance which can be, but should not be limited to, NaOH, $K_2CO_3$, $Na_2CO_3$, $NaHCO_3$, $KHCO_3$, $CaCO_3$, NaCl, and $H_2SO_4$. The on/off associated with the control vale V1 is utilized to control the quantity of first reaction fluid F11 flowing into the first liquid area A1 while the on/off associated with the control vale V2 is utilized to control the quantity of the second reaction fluid F12 flowing into the second liquid area A2. The first plate 20 is anode and the second plate 21 is the cathode.

When the first plate 20 and the second plate 21 of the electrode device 2d are electrically connected to the power source, and the electrode device 2d starts to rotate, a velocity difference is generated between the center of the rotating shaft 27 and the peripheral of the rotating shaft 27 such that a negative pressure is generated for drawing the first reaction fluid F11 into the branch channels 271. The first reaction fluid F11 enters the second hollow channel 270 and finally, enters the first flow channel 220 through the flow inlet 201. The first reaction fluid F11 entering into the first flow channel 220 is reacted with the first plate 20 for generating oxygen. The oxygen is thrown out of the electrode device 2d through the rotation of the electrode device 2d whereby the first reaction fluid F11 becomes an alkali ionic fluid having micro oxygen bubbles. The third control valve V3 is utilized to control the alkali ionic fluid having micro oxygen bubbles exhausting out of the container 37. In the mean time, a velocity difference is generated between the center of the rotating shaft 25 and the peripheral of the rotating shaft 25 such that a negative pressure is generated for drawing the second reaction fluid F12 into the branch channels 251. The second reaction fluid F12 enters the first hollow channel 250 and finally, enters the second flow channel 227. In the electrolytic reaction, the second plate 21 and the second reaction fluid F12 are reacted to generate hydrogen. The hydrogen is thrown out of the electrode device 2d through the rotation of the electrode device 2d whereby the second reaction fluid F12 becomes an acidic ionic fluid having micro hydrogen bubbles. The fourth control valve V4 is utilized to control the acidic ionic fluid having micro hydrogen bubbles exhausting out of the container 37.

According to the above described embodiments, the hydrogen and oxygen bubbles attached onto the cathode and anode can be thrown out of the electrode device thereby increasing the efficiency of the electrolytic reaction and achieving effects of simultaneously performing electrolytic process and generating fluid having bubbles contained therein.

While the present invention has been particularly shown and described with reference to a preferred embodiment, it will be understood by those skilled in the art that various changes in form and detail may be without departing from the spirit and scope of the present invention.

What is claimed is:
1. A pumping device, comprising:
a housing, configured to have an inlet opening at one side for allowing a first fluid flowing inside the housing, and an exhausting opening; and
an electrode device, arranged inside the housing, the electrode device comprising a rotating body having a flow inlet, a plurality of first flow channels, at least one first electrode, and at least one second electrode, wherein the rotating body generates a negative pressure through a rotation for drawing the first fluid to enter the plurality of the first channels through the flow inlet, the at least one first electrode and the at least one second electrode generate an electrolytic reaction with the first fluid, the first fluid and bubbles generated by the at least one first electrode and the at least one second electrode are exhausted through an exhausting outlet of each first flowing channels and the first fluid having the bubbles is exhausted out of the housing through the exhausting opening;
wherein the rotating body further comprises a first plate as the first electrode, a second plate as the second electrode, and an isolation part, wherein the first plate has a first surface and the flow inlet, the second plate has a second surface opposite to the first surface, the isolation part is arranged between the first plate and the second plate and is connected to the first and second surfaces, and the plurality of the first flow channels are formed within the isolation part and are communicated with the flow inlet;
wherein the isolation part comprises a plurality of isolation structures, and each of the first flow channel is formed between the two adjacent isolation structures;
wherein a plurality of magnetic elements are arranged in an area of the first and second plates between two adjacent isolation structures.

2. The pump device of claim 1, wherein each isolation structure is a cycloid structure.

3. The pump device of claim 1, wherein each isolation structure is formed by a non-conductive magnetic material.

4. The pump device of claim 1, wherein a plurality of through holes are formed on the first plate and the second plate corresponding to the isolation structures.

5. The pump device of claim 1, further comprising at least one gas channel passing through the second plate, the isolation part, and the first plate and communicating with the flow inlet.

6. The pump device of claim 1, wherein the rotating body comprises a second plate coupled to a first rotating shaft, a plurality of isolation structures formed on the second plate such that a plurality of the first flow channels are formed between two adjacent isolation structures, wherein at least one first electrode and second electrode are formed on the second plate between two adjacent isolation structures.

7. A pumping device, comprising:
a housing, configured to have an inlet opening at one side for allowing a first fluid flowing inside the housing, and an exhausting opening; and
an electrode device, arranged inside the housing, the electrode device comprising a rotating body having a flow inlet, a plurality of first flow channels, at least one first electrode, and at least one second electrode, wherein the rotating body generates a negative pressure through a rotation for drawing the first fluid to enter the plurality of the first channels through the flow inlet, the at least one first electrode and the at least one second electrode generate an electrolytic reaction with the first fluid, the first fluid and bubbles generated by the at least one first electrode and the at least one second electrode are exhausted through an exhausting outlet of each first flowing channels and the first fluid having the bubbles is exhausted out of the housing through the exhausting opening;

wherein the rotating body further comprises a first plate as the first electrode, a second plate as the second electrode, and an isolation part, wherein the first plate has a first surface and the flow inlet, the second plate has a second surface opposite to the first surface, the isolation part is arranged between the first plate and the second plate and is connected to the first and second surfaces, and the plurality of the first flow channels are formed within the isolation part and are communicated with the flow inlet;

wherein the second plate is coupled to a first rotating shaft receiving a driving force to perform the rotation;

wherein the first rotating shaft further comprises:
a first hollow channel, having a first inlet for allowing a second fluid to flow into the first hollow channel; and
a porous plate, connected to the first hollow channel, wherein the second fluid is exhausted from the porous plate and is cut by the first fluid thereby forming a plurality of micro bubbles.

8. The pump device of claim 7, wherein the porous plate is arranged at an inlet side of the flow inlet, and the porous is connected to the first rotating shaft through an engaging element.

9. An electrode device, comprising:
a first plate, configured to be a first electrode having a first surface;
a second plate, configured to be a second electrode having a second surface opposite to the first surface; and
an isolation part, arranged between the first and the second plate and connected to the first and second surfaces, wherein the isolation part further comprises:
a supporting plate, configured to have a third surface opposite to the first surface, and a fourth surface opposite to the second surface;
a plurality of first isolation structures, formed between the first plate and the supporting plate, and connected to the first and third surfaces, wherein the a first flow channel is formed between two adjacent first isolation structures for guiding a fluid; and
a plurality of second isolation structures, formed between the second plate and the supporting plate, and connected to the second and fourth surfaces wherein a second flow channel is formed between two adjacent second isolation structures for guiding the fluid;

wherein the electrode device is rotated to draw the fluid to flow into the first and second flow channels such that an electrolytic reaction is generated between the first and second plates and the fluid;

wherein the electrode device further comprises a first exchanging membrane formed on the third surface, and a second exchanging membrane formed on the fourth surface.

10. The electrode device of claim 9, wherein the supporting plate is formed by a metal material having a plurality of through holes formed thereon.

11. An electrode device, comprising:
a first plate, configured to be a first electrode having a first surface;
a second plate, configured to be a second electrode having a second surface opposite to the first surface; and
an isolation part, arranged between the first and the second plate and connected to the first and second surfaces, wherein the isolation part further comprises:
a supporting plate, configured to have a third surface opposite to the first surface, and a fourth surface opposite to the second surface;
a plurality of first isolation structures, formed between the first plate and the supporting plate, and connected to the first and third surfaces, wherein the a first flow channel is formed between two adjacent first isolation structures for guiding a fluid; and
a plurality of second isolation structures, formed between the second plate and the supporting plate, and connected to the second and fourth surfaces wherein a second flow channel is formed between two adjacent second isolation structures for guiding the fluid;

wherein the electrode device is rotated to draw the fluid to flow into the first and second flow channels such that an electrolytic reaction is generated between the first and second plates and the fluid;

wherein the first plate has a flow inlet, the second plate is connected to the first rotating shaft receiving a driving force for performing a rotation, wherein the first rotating shaft has a first hollow channel communicated with the second flow channel.

12. The electrode device of claim 11, wherein the flow inlet further connected to a second shaft having a second hollow channel communicated with the first flow channel.

* * * * *